US009813408B2

(12) United States Patent
Hefter et al.

(10) Patent No.: US 9,813,408 B2
(45) Date of Patent: Nov. 7, 2017

(54) ASSET GUARDIAN

(71) Applicant: Verizon Patent and Licensing Inc., Arlington, VA (US)

(72) Inventors: Jesse Hefter, Brookline, MA (US); Victor D. Chan, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 14/309,250

(22) Filed: Jun. 19, 2014

(65) Prior Publication Data
US 2015/0372995 A1 Dec. 24, 2015

(51) Int. Cl.
H04L 29/06 (2006.01)
H04W 12/06 (2009.01)
G06F 21/88 (2013.01)

(52) U.S. Cl.
CPC ............ H04L 63/083 (2013.01); G06F 21/88 (2013.01); H04W 12/06 (2013.01); *H04L 63/0428* (2013.01); *H04L 63/08* (2013.01)

(58) Field of Classification Search
CPC ............. H04L 12/2803; H04L 12/2814; H04L 12/2818; H04L 63/0471; H04L 63/061; H04L 63/0492; H04L 63/083; H04W 12/06; H04W 12/04
See application file for complete search history.

(56) References Cited

U.S. PATENT DOCUMENTS

| 6,005,476 A * | 12/1999 | Valiulis | G08B 13/1418 340/12.32 |
| 2005/0275536 A1* | 12/2005 | Celi | E05B 73/00 340/542 |
| 2012/0072038 A1* | 3/2012 | Kolar | G06F 1/3262 700/291 |
| 2015/0062343 A1* | 3/2015 | Hwang | B60R 25/102 348/148 |

* cited by examiner

*Primary Examiner* — Amir Mehrmanesh

(57) ABSTRACT

An asset guardian system may comprise a server including a processor with memory and a database. The processor may be configured to receive asset information regarding a plurality of assets and update the database with the received asset information. A mobile device may be configured to change at least one of the assets from a disabled condition to an enabled condition in response to an asset code from the server. At least one of the plurality of assets may be configured to authenticate the asset code and register the asset code with the server thereby updating the asset information on the database. At least one of the plurality of assets may further be configured to be operatively paired with a respective socket.

20 Claims, 5 Drawing Sheets

ASSET GUARDIAN

BACKGROUND

Assets of various types may be deployed to support consumer activities. Sometimes these assets may be positioned to promote consumer access with limited theft prevention measures, primarily relying on the bulky nature of the asset to deter theft. Examples of deployed assets may include appliances such beverage coolers and refrigerators in convenience stores and washing and drying machines in laundromats. Occasionally, theft of assets may occur resulting in the monetary loss associated with the asset as well as any items contained therein. It may be desirable for equipment manufacturers and owners to employ asset guardians, for example, to provide asset monitoring to deter theft and tampering as well as asset tracking with respect to unauthorized activities such as movement, disassembly, and theft. It may further be desirable for asset guardians to provide alerts and notifications in the event that the asset has been compromised, for example, by providing updated asset information such as the current asset location during transit to or when repowered at an unauthorized location. In addition, it may be desirable for asset guardians to be configured to entirely or partially disable the asset in response to unauthorized activities.

DETAILED DESCRIPTION

An asset guardian system may be configured to monitor, manage, and track assets of all types. An exemplary system may reduce unauthorized activities (e.g., theft) of assets by monitoring and managing operation of the asset based on asset information, which may include an asset code. The system may perform authentication of the asset code with the asset and another portion of the system. Authentication may operatively change the asset between a disabled condition and an enabled condition. For example, prior to authentication, the asset may have the disabled condition having limited power to inhibit usage or item vending while providing power to monitor and maintain the asset and any items therein, for example, to maintain refrigeration of products such food and beverages. Upon authentication, the asset may have the enabled condition to allow full operation of the asset, for example allowing usage or item vending. The system may further provide real-time verification of asset information (e.g., asset location) as well as continuous or periodic updates to the asset information. The system may also utilize sensors for improved theft deterrence as well as asset management with asset controllers. In addition, the system may utilize a server (e.g., utilizing local or cloud-based services) and web-based applications to provide monitoring, management, service and repair, notifications and alerts, remote interfacing, and recovery assistance with respect to assets.

Figure 1:
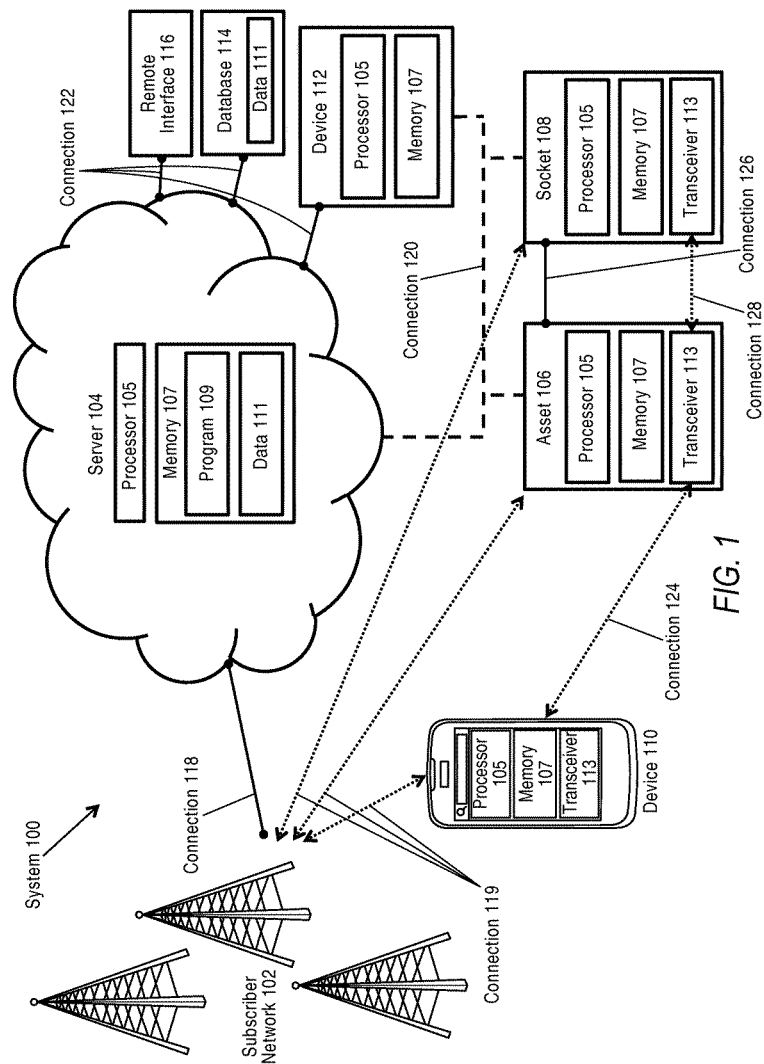
FIG. 1 illustrates an exemplary asset guardian system for monitoring and managing assets of the present disclosure.

FIG. 1 illustrates an exemplary system 100, for example an asset guardian system. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, system 100 may include a subscriber network 102, a server 104, an asset 106, a socket 108, a device 110, a device 112, a database 114, and a remote interface 116. Any or all of these devices may include a processor 105 and a memory 107. Memory 107 may include a program 109 (e.g., including an asset guardian program) and data 111, which may be transferred to any portion of system 100. Database 114 may also include data 111. Exemplary data 111 may include asset information and subscriber information, described below. Asset 106, socket 108, and device 110 may further include a transceiver 113.

System 100 may include a network that provides the infrastructure through which the server 104, asset 106, socket 108, device 110, device 112, database 114, and external interface 116 may communicate, for example, data 111 with each other. For instance, the network may be an infrastructure that generally includes edge, distribution, and core devices (e.g., server 104) and enables a path (e.g., connections 118, 119, 120, 122, 124, 126, and 128) for the exchange of information (e.g., data 111) between different devices and systems (e.g., between server 104, asset 106, socket 108, device 110, device 112, database 114, and remote interface 116). In general, a network (e.g., system 100 or subscriber network 102) may be a collection of computers and other hardware to provide infrastructure to establish connections and carry communications.

Further, system 100 may utilize a network with any networking technology. System 100 may utilize any wired or wireless network. The network may include a packet network or any other network having an infrastructure to carry communications. Exemplary networks may include one or more of a cellular network, telephone network, global area network, wide area networks, a VoIP network, an LTE network, a VoLTE (Voice over LTE) network, fiber optic network, cable network, television network, local area networks (e.g., Ethernet), wireless local area networks (e.g., radio-frequency (RF) or Wi-Fi), power-line networks, or combinations thereof. The network may further include a direct wired connection, for example, a data cable connecting two or more devices. For example, the network may include a wide area network, for example, to provide connection 118 with subscriber network 102 and server 104. The network may include a cellular network, for example, to provide connection 119 with subscriber network 102 and one or more assets 106, sockets 108, and devices 110. The network may include a power-line network, for example, to provide connection 120 with server 104, asset 106, socket 108, and device 112. The network may include a local area network (e.g., Ethernet) or direct wired connection, for example, to provide connection 122 with server 104 and device 112, database 114, and remote interface 116. The network may include a wireless local area network (e.g., radio-frequency or Wi-Fi), for example, to provide connections 124 with asset 106 and device 110 and connection 128 with asset 106 and socket 108. The system 100 is provided as an example, and thus while a single cloud illustrates server 104, this illustration may represent a single network, a combination of different networks components and technologies, and/or a plurality of networks, as described above.

Subscriber network 102 may be configured to provide communications services to and between a plurality of devices (e.g., one or more server 104, asset 106, socket 108, and device 110). Subscriber network 102 may also be configured to generate subscriber information including location information, for example, to provide an asset location of asset 106 or of device 110 in proximity to asset 106. The subscriber network 102 may provide communications services, such as packet-switched network services (e.g., Internet access, VoIP (Voice over Internet Protocol) communication services) and location services (e.g., device positioning), to devices connected to the subscriber network 102. Exemplary subscriber networks 102 may include any network discussed above, for example a VoIP network, an LTE network, a VoLTE (Voice over LTE) network, a cellular network, a telephone network, a fiber optic network, a cable network, and a television network, as some non-limiting examples. Devices on the subscriber network 102 may be associated with subscriber information including subscriber identifiers used to uniquely identify the corresponding devices. Subscriber identifiers may include various types of information sufficient to identify the identity of a subscriber or a subscriber device over the subscriber network 102, such as mobile device numbers (MDNs), mobile identification numbers (MINs), mobile telephone numbers (MTN), common language location identifier (CLLI) codes, Internet protocol (IP) addresses, and universal resource identifiers (URIs), as some non-limiting examples.

Exemplary assets 106 may include any devices that may be susceptible to theft or may benefit from monitoring or tracking of asset information. For example, assets 106 may include appliances (e.g., vending machines, beverage coolers, refrigerators, washing machines, or drying machines), electronics (e.g., televisions or audio systems), and vehicles (e.g., automobiles). As discussed in more detail below, one or more assets 106 may be authenticated with an asset code (e.g., from server 104, socket 108, or device 110), which may be configured to allow operation of asset 106. In addition, one or more assets 106 may be configured to be paired with one or more sockets 108, which may provide asset information regarding any assets 106 connected thereto.

Exemplary socket 108 may include any device that may be configured to receive a power or data plug. Socket 108 may include any electrical, power, phone, or Ethernet socket. Socket 108 may be grounded, polarized, fused, or insulated. Socket 108 may be configured to receive a plug having any number of pins, e.g., two, three, or more pins. Socket 108 may be configured to connect to a network, e.g., power-line network connection.

Server 104 may be configured to coordinate data 111 (e.g., asset information) with assets 106, socket 108, device 110, device 112, database 114, and remote interface 116. Server 104 may continuously or periodically (e.g. hourly, daily, weekly, monthly, or annually) receive updated asset information (referred to herein as "health checks"), for example, from asset 106, socket 108, or device 110. Server 104 may further include a local or cloud-based server and may provide asset information to a web-based user interface, which may be displayed by device 110, device 112, or any device connected to remote interface 116. After receiving updated asset information, server 104 may continuously or periodically provide updated asset information to any other device of system 100, for example, asset 106, socket 108, device 110, device 112, and remote interface 116. Server 104 may distribute asset information with or without constant network connectivity to assets 106.

Server 104 may be configured to generate notifications associated with assets 106. For example, notifications may be generated in response to updated asset information of asset 106, for example a change in the asset location, which could be represented by a change in location coordinates derived from a global positioning system ("GPS"), or via triangulation from cell sites, or other similar techniques. Location information could also be derived from an IP address, or other network address, associated with a socket. Server 104 may receive updated asset information from asset 106, socket 108, device 110, or device 112. Server 104 may compare the asset information of asset 106 (e.g., asset location from transceiver 113 of asset 106) with the asset information according to server 104 (e.g., asset location as part of database 114). If the asset information matches, asset 106 may continue full operation thereby allowing full power to asset 106. If the asset information according to asset 106 and server 104 does not match, server 104 may be configured to provide a notification to asset 106, device 110, device 112, and remote interface 116 and, in addition, asset 106 will remain in a disabled condition providing limited power to inhibit use or item vending while providing power to monitor and maintain asset 106 or any items therein (e.g., food or beverages requiring refrigeration).

For example, server 104 may communicate the notification using an automated phone call, text message, e-mail, web portal, or any other type of electronic communication, which may be received by one or more users of asset 106, device 110, device 112, and remote interface 116. The notification (e.g., to asset 106) may partially or entirely disable operation of asset 106. The notification (e.g., to device 110) may notify the user that the location information of asset 106 has changed or indicating that asset 106 may require service. The notification (e.g., to device 112) may provide the user (e.g., an asset controller or owner) with updated asset information, for example allowing the user to verify the updated asset information and call or otherwise notify authorities (e.g., security personnel, police, or fire department) of unauthorized activities regarding asset 106. The notification (e.g., to remote interface 116) may communicate the notification to a user remote from system 100, for example, a dispatcher of security, police or fire personnel.

The connections 118, 119, 120, 122, 124, 126, and 128 may be any wired or wireless connections between two or more endpoints (e.g., devices or systems), for example, to facilitate transfer of data 111 (e.g., including asset information). Connections 118 (e.g., an Ethernet connection) may communicatively connect server 104 to subscriber network 102. Connection 119 (e.g., a cellular connection) may communicatively connect subscriber network 102 with asset 106, socket 108, and device 110. Connection 120 (e.g., a power-line connection) may communicatively connect server 104, asset 106, socket 108, and device 112. Connection 122 (e.g., an Ethernet connection) may communicatively connect server 104, device 112, database 114, and third-party interface 116. Connection 124 (e.g., a radiofrequency connection) may communicatively connect device 110 with one or more assets 106. Connection 126 (e.g., a power connector of asset 106 into a power receptacle of socket 108) may communicatively and operatively connect asset 106 and socket 108. Connection 128 (e.g., a radiofrequency connection) may communicatively connect asset 106 and socket 108.

Data 111 may include asset and subscriber information related to any component of system 100. Data 111 may include asset information of each asset 106 and socket 108. Data 111 may include subscriber information related to one or more devices 110. For each asset 106 and socket 108, data 111 may include or indicate an asset description (e.g., asset identification number, asset code, a machine readable barcode (e.g., a quick response (QR) code), RFID, asset type, model number, and commission date), an asset registry (e.g., a listing of assets 106, sockets 108, and quantities and types of assets 106 and sockets 108), an asset location (e.g., global position system (GPS) coordinates, physical address, network address, and description relative to a particular facility), times and dates associated with alerts and notifications, recent health checks, a sensor status and history, an operating status and history, third-party information from remote interface 116, and a authentication status and history between assets 106 and sockets 108.

Data 111 may further include asset information related to users of system 100. Exemplary users may include of the installers, servicers, asset controllers, asset owners, and any other users of system 100. Data 111 may include a listing or table of individual names, company names, addresses, identification numbers, asset permissions, and user account statuses associated with each asset 106. Data 111 may include a listing of users (e.g., installers) who are authorized to authenticate or initiate operation of each asset 106. Data 111 may include asset permissions associated with each asset 106, for example asset controllers authorized to manage a particular asset group or authorized installers or servicers for particular assets 106 and sockets 108. Data 111 may also include a listing of users (e.g., installers or servicers) that have successfully or unsuccessfully installed, authenticated, or serviced particular assets 106 and sockets 108.

Data 111 may include an asset code configured to activate operation of assets 106 using program 109. To reduce unauthorized authentications of assets 106, data 111 may be encrypted using secure key classes. For example, a key may be included in a text field in a file record of data 111 or as part of memory 107 or database 114. Using the key, encrypted data 111 may be decrypted to determine the asset code to initiate operation of asset 106. As data 111 passes through system 100, the key may be decrypted and unencrypted with an algorithm using the secure key classes.

An exemplary algorithm may include an RSA algorithm that may use a product of prime numbers along with an auxiliary value as a public RSA key to encrypt data 111 (e.g. at subscriber network 102 or server 104) and knowledge of the prime numbers as a private RSA key (e.g., on part of memory 107 of asset 106 or on part of database 114) to decrypt data 111. Upon decryption of data 111 (e.g., at asset 106), the received asset code may be authenticated by comparing the received asset code with an asset code as part of memory 107 (e.g., of asset 106) or as part of database 114. In addition, the private RSA keys may be periodically changed to change the working public RSA keys as data 111 passes through system 100.

Program 109 may include an asset guardian program and may be configured to update and transfer asset information between server 104, asset 106, socket 108, device 110, device 112, database 114, and remote interface 116. Program 109 may include a mobile or web-based application configured to display and update asset information as part of memory 107 or database 114. Program 109 may be configured to coordinate asset information, for example, using any of server 104, asset 106, socket 108, device 110, and device 112. Further, program 109 may be configured to discover the presence of assets 106, for example upon connection to server 104 or a socket 108 or a power outlet in communication with the power-line network (e.g., connection 120). Alternatively, program 109 may further be configured to detect an interruption of connectivity with asset 106. In response to updated asset information, program 109 may distribute an automated notification message to the devices of system 100 thereby informing one or more users of a change in the asset information associated with asset 106.

Program 109 may be configured to display and provide location information to one or more users. Program 109 may be configured to provide web-based asset management and recovery for assets 106. For example, a notification may (e.g., indicating a change in asset location) may be sent and displayed to a first user (e.g., asset controller) to verify the asset location with database 114. If the first user determines that the asset location is unauthorized, a notification may be sent (e.g., using remote interface 116) to a second user (e.g., a dispatcher of security, police, or fire personnel) to assist in the recovery of assets 106. Thus, program 109 may be configured to directly or indirectly notify users in response to updated asset information.

In addition, program 109 may be configured to authenticate assets 106 with respect to an asset code. As discussed above, authentication may include a pairing of an asset 106 with an asset code configured to allow full operation of the asset 106. The asset code may be included as part of memory 107 of asset 106 or as part of database 114. Server 104 may send the asset code directly to asset 106 or through socket 108 or device 110. After the asset 106 receives the asset code, authentication may matching the received asset code with the asset code as part of memory 107 or database 114. If the asset codes match, asset 106 may utilize the enabled condition allowing power for full operation. Otherwise, asset 106 may utilize the disabled condition allowing limited power to maintain and monitor asset 106 and any items therein. After authentication, the updated asset information including the enabled or disabled condition of asset 106 may be provided to server 104.

As an alternative or in addition using secure key classes discussed above, program 109 may further include an encrypted application to facilitate authentication of assets 106. Program 109 may be configured to prevent a user (e.g., installer) from displaying or trapping the asset code while installing or initiating operation of asset 106. The asset code may be received by the encrypted application and passed to asset 106 or socket 108, which may change asset 106 from the disabled condition to the enabled condition thereby allowing full operation of asset 106. After authentication, program 109 may communicate the authenticated asset code to server 104 thereby registering the authenticated asset code with server 104. In addition, program 109 may be configured to page a particular asset 106 to generate an audible alert to confirm authentication of asset 106.

The asset 106, socket 108, device 110, and device 112 may further include a display, support user interfaces, and/or communicate within the system 100. A display is an output device for presentation of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. Thus, the display may present user interfaces or a web portal to a user, such that the user may interact with and receive information from other devices of system 100.

In addition to the above, device 110 may include any device configured to utilize program 109, display program 109 to a user, and authorize the authentication of asset 106. Device 110 may also be configured to receive an asset code, prompt an authorization response from a user, and, if authorized, send the asset code to asset 106 (e.g., using connection 124). Device 110 may further communicate the authentication (e.g., using connections 118 and 119) to server 104 to register the authentication in the asset information as part of database 114. Device 110 may further include a camera configured to obtain and upload an image of asset 106 to server 104, for example, to be stored in the asset information as part of database 114. Thus, device 110 may be utilized to provide asset information and authenticate assets 106.

Transceiver 113 may communicatively connect the devices of system 100, for example, using any type of wired or wireless network connection. The wireless network may utilize a wireless transmitter (e.g., cellular, radio-frequency or Wi-Fi transmitter) of transceiver 113. Transceiver 113 may be configured to communicatively connect asset 106 and device 110 using connection 124 (e.g., a wireless signal) and asset 106 and socket 108 using connection 128 (e.g., a wireless signal). Transceiver 113 may be used for digital or analog signal transfers. For instance, transceiver 113 may include any antenna technology including cellular, radiofrequency (RF), near field communication (NFC), Bluetooth®, Wi-Fi, or the like. Transceiver 113 may include any technology that implements a wireless exchange of data by converting propagating electromagnetic waves to and from conducted electrical signals. Transceiver 113 may include any technology that is used to exchange data wirelessly using radio waves over a radio range or network that enables communication.

Transceiver 113 may also include a location determination technology that enables the determination of a current geographic position such as an asset location. Examples of location determination technology may include, without limitation, global positioning systems (GPS), indoor positioning system, local positioning system, and mobile phone tracking. Transceiver 113 may be configured to determine an asset location and send health checks, as discussed above, to server 104 to confirm the asset location as part of database 114.

Database 114 may include any device configured to store data 111 including the asset information and subscriber information, discussed above. Database 114 may include a local database or a cloud database. Database 114 may be accessed by any device (e.g., server 104, asset 106, socket 108, device 110, device 112, and remote interface 116) configured to access a database, e.g., including a web-based platform. Database 114 may be selectively accessed according to controller groups, discussed in more detail below.

Remote interface 116 may be configured to provide and receive updated asset information to and from remote users. Remote interface 116 may be configured to provide notifications to a remote user in response to unauthorized activities (e.g., theft), for example a dispatcher of security, police, or fire personnel. Remote interface 116 may further be configured receive updated asset information from a utility service provider, a security services provider, an automation services provider, an alarm service provider, a police department, or a fire department. Remote interface 116 may be configured to transfer asset information with remote users.

For example, if asset 106 detects loss of primary power, asset 106 may connect to server 104, as described above, and utilize remote interface 116 to confirm with a utility company if there has been a facility power interruption associated with the asset location of asset 106. If there has been a facility power interruption, asset 106 may associate the loss of primary power with the facility power interruption and provide updated asset information to server 104. If there has not been a facility power interruption, asset 106 may generate an alert and send a notification to server 104.

As another example, asset 106 may connect with server 104 and utilize remote interface 116 to communicate with a security services provider. The security services provider may provide information regarding a detector (e.g., motion or smoke), sensors, cameras, or alarms of a facility containing asset 106 or a vehicle transporting asset 106. The monitoring information may be distributed to or collected from system 100, for example to device 110, server, 110, assets 106, and sockets 108. The monitoring information may be included in the asset information as part of memory 107 or database 114. The monitoring information may further be used to verify asset information of server 104, assets 106, sockets 108, device 110, or device 112. For example, the monitoring information may include any security or fire alarms associated with the asset location. As a further example, if the power is disconnected from asset 106, remote interface 116 may be utilized to confirm if there is a fire or break-in associated with the facility. In response, asset 106 may generate an alert and send a notification to server 104.

Any portion of system 100 (e.g., server 104, asset 106, socket 108, device 110, and device 112) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 and the server 104, asset 106, socket 108, device 110, and device 112 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., server 104, asset 106, socket 108, device 110, and device 112) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices (e.g., device 110), cellular phones, smart-phones, superphones, tablet computers, next generation portable devices, mobile printers, handheld computers, secure voice communication equipment, networking hardware, or some other computing system and/or device. Alternatively, computing systems and/or devices may also be a computer workstation, a server, a desktop, a notebook, a tablet, a phone, desktops, notebooks, laptops, phones, tablets, computer workstations, next generation portable devices, handheld computers, or some other computing system and/or device.

Further, processor 105 receives instructions from memory 107 and executes the instructions, thereby performing one or more processes, including one or more of the processes described herein. Such instructions and other data may be stored and transmitted using a variety of computer-readable mediums (e.g., memory 107). Processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

A memory 107 may be, in general, any computer-readable medium (also referred to as a processor-readable medium) that may include any non-transitory (e.g., tangible) medium that participates in providing data (e.g., instructions) that may be read by a computer (e.g., by the processors 105 of the server 104, asset 106, socket 108, device 110, and device 112). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The server 104, device 110, and device 112 may include processor 105 that is configured to manage records memorializing the asset information as part of memory 107 or database 114. The server 104, device 110, and device 112 may further utilize the processor 105 to access, receive, and evaluate asset information, for example, associated with one or more assets 106. Further, databases, data repositories or other data stores (e.g., memory 107 or database 114) described herein may generally include various kinds of mechanisms for storing, providing, accessing, and retrieving various kinds of data, including a hierarchical database, a set of files in a file system, an application database in a proprietary format, a relational database management system (RDBMS), etc. Each such data store may generally be included within or external to a computing system and/or device (e.g., server 104, asset 106, socket 108, device 110, and device 112) employing a computer operating system such as one of those mentioned above, and/or accessed via a network (e.g., system 100 or subscriber network 102) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The server 104, asset 106, socket 108, device 110, and device 112 may include any electronic hardware that includes a processor 104 and a memory 105 and is capable of sharing data 111, such as transfers between any of server 104, asset 106, socket 108, device 110, device 112, database 114, and remote interface 116 that utilize communications technologies between any of server 104, asset 106, socket 108, device 110, device 112, database 114, and remote interface 116. Examples of communication technologies may include, without limitation, any wired or wireless communication technology, such as cellular, near field communication (NFC), Bluetooth®, Wi-Fi, and radio frequency technologies. Communication technologies may include any technology configured to exchange electronic data by converting propagating electromagnetic waves to and from conducted electrical signals.

Figure 2:
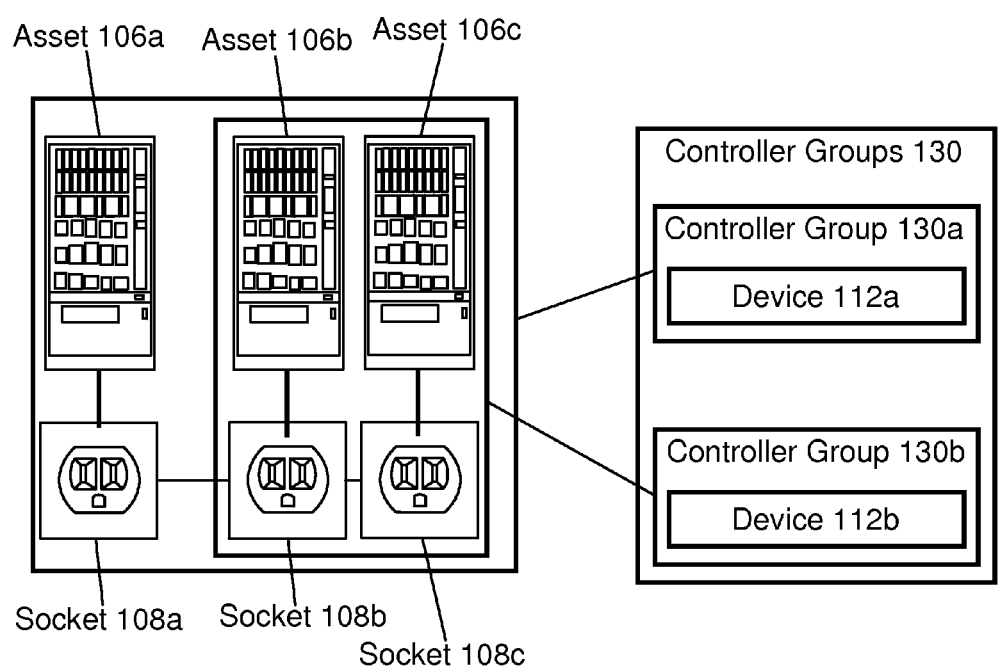
FIG. 2 illustrates an exemplary asset guardian system, for example, including asset controller groups to monitor and manage a plurality of assets.

FIG. 2 illustrates an exemplary system 100 may be monitored and controlled by any number of controller groups 130, each including one or more assets 106. Each controller group 130 may further monitor and control one or more sockets 108. An asset controller may include a user (e.g., asset controller) designated to monitor and control one or more controller groups 130, for example, using device 112. Controller groups 130 may be configured to monitor (e.g., using device 112) asset information and manage operation of a predefined set of assets 106 and sockets 108. Each asset controller group 130 may access the predefined defined set based on asset permissions as part of database 114. The asset permissions for each asset controller group may be defined on a database record as part of database 114. Device 112 may display asset information relevant to the assets 106 that are controlled by the particular asset controller group 130. The asset controller groups may be grouped according to selected asset information, for example the type or location of assets 106 and sockets 108.

As illustrated in FIG. 2, controller group 130a may be associated with a first set of assets 106 and sockets 108 and controller 130b may be associated with a second set of assets 106 and sockets 108, which may be a subset of the first set. The first set may include a global group including all regions and all types of assets 106 (e.g., assets 106a, 106b, and 106c) and sockets 108 (e.g., sockets 108a, 108b, and 108c). The second set may include a focused group including regional or selected types of assets 106 (e.g., assets 106b and 106c, but not asset 106a) and sockets 108 (e.g., sockets 108b and 108c, but not socket 108a). For example, controller group 130a may be associated with the first set including assets 106a, 106b, and 106c and sockets 108a, 108b, and 108c but controller group 130 may only be associated with the second set, a subset of the first set, including assets 106b and 106c and sockets 108b and 108c. Alternatively, controller groups 130a and 130b may be associated with sets that are independent of each other, for example, defined by different regions or types of assets 106 and sockets 108.

Further, controller group 130 may be assigned according to a particular facility or network device. For example, assets 106 may be housed in a particular facility or operatively connected to one or more local area networks (e.g., wireless networks) having one or more network devices (e.g., wireless routers) associated with one or more facilities. The controller group 130 may communicate with the plurality of assets 106, for example, to locally manage the plurality of assets 106 associated with each network or facility.

Figure 3:
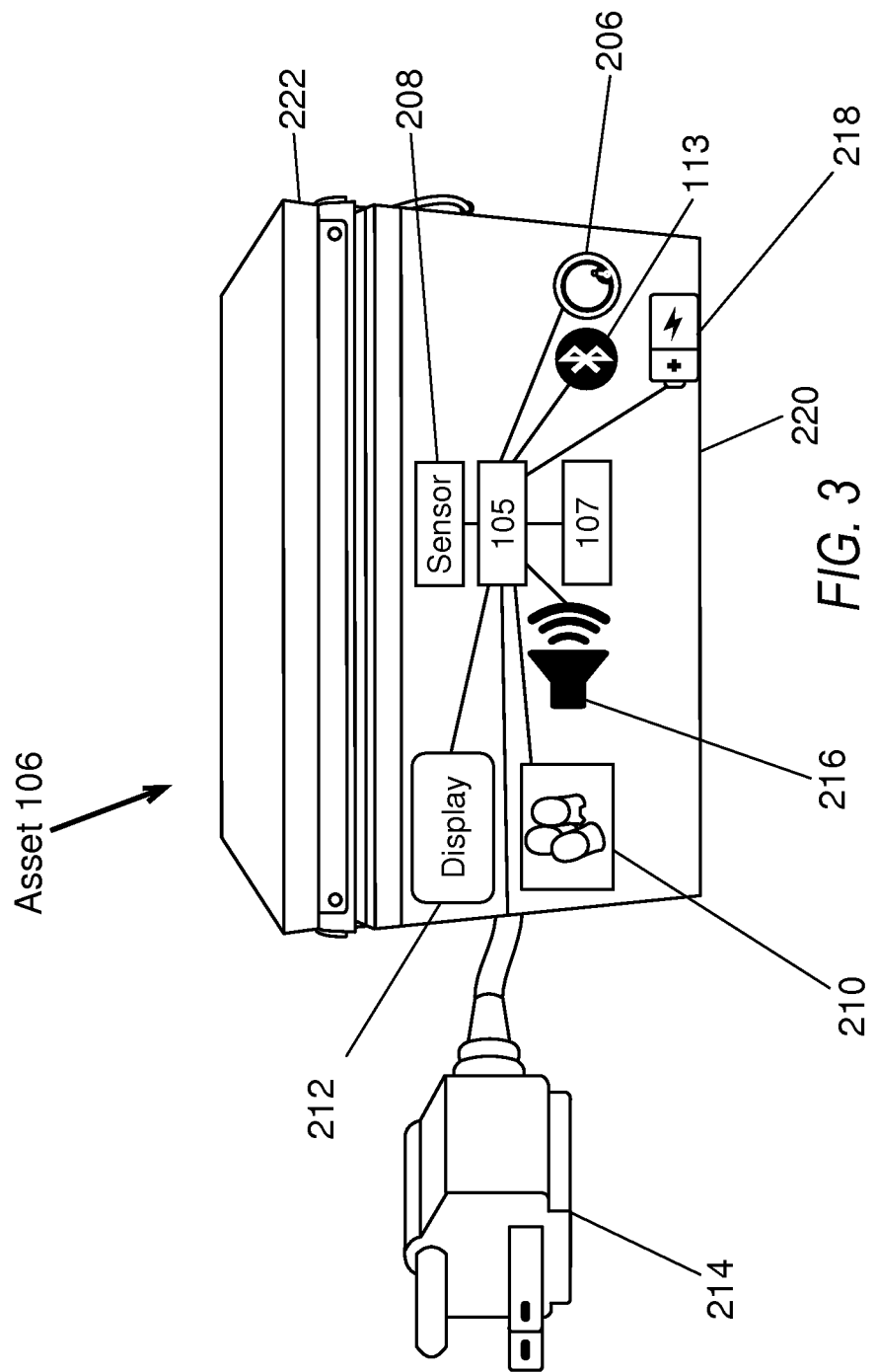
FIG. 3 illustrates an exemplary asset of an asset guardian system of the present disclosure.

FIG. 3 illustrates an exemplary asset 106 of asset guardian system 100. Asset 106 may take many different forms and include multiple and/or alternate components and facilities. While an exemplary asset 106 is shown in FIG. 2, the exemplary components illustrated in FIG. 2 are not intended to be limiting. Indeed, additional or alternative components and/or implementations may be used.

As illustrated in FIG. 3, asset 106 may include processor 105, memory 107, transceiver 113, an identification mechanism 206, an alarm 208, an indicator 210, a display 212, a connector 214, an alarm 216, a backup power 218, a housing 220, a door 222, and a compartment 224 (not shown). Processor 105 may be operatively connected to transceiver 113, identification mechanism 206, alarm 208, indicator 210, display 212, connector 214, alarm 216, and backup power 218. Transceiver 113 may include any device configured to transmit or receive asset information such as an asset location, as described above. Indicator 210 may include any device configured to provide an audio-visual indicator, for example an audio indicator providing a beep (e.g., having an audible decibel level less than a fire or klaxon level alarm), a visual indicator providing light such as an LED, or a combination thereof. For example, indicator 210 may be used to locate one or more specific assets among a plurality of assets or within one or more areas of a facility. Display 212 may include any display, as described above, and may be configured to display asset information (e.g., a QR code) related to any portion of system 100. Housing 220 may include door 222 that is configured to be movable between an opened condition and a closed condition, for example, transfer items with respect to compartment 224.

Asset 106 may be configured to store asset information as part of memory 107 and provide asset information to server 104, socket 108, and device 110. Asset information may be provided using identification mechanism 206 that may include any device configured to provide asset information, for example using an identification mechanism (e.g., radio frequency identification (RFID) or a near field communication (NFC) or Bluetooth tag). Alternatively, asset information may be provided using transceiver 113, as discussed above. Program 109 (e.g., using device 110) may be configured to scan and receive asset information using the identification mechanism.

Connector 214 may include any device configured to connect an AC power source to a primary or AC power supply (not shown) of asset 106. Connector 214 may alternatively or additionally include the identification mechanism of the particular asset 106, which may be associated with one or more sockets 108. Upon plugging connector 214 of asset 106 into socket 108, the identification mechanism may transfer asset information (e.g., asset code) to socket 108, which may be communicatively connected to server 104. If the asset code of the asset 106 corresponds to the socket 108 designated in the asset information as part of database 114, socket 108 may provide power to asset 106 thereby allowing operation of asset 106. If the asset code of the asset 106 does not correspond to the socket 108, socket 108 may entirely or partially disable power to asset 106, as described above.

Backup power 218 may include any device configured to supply power independently of the primary power source and may include, for example, a secondary or DC power supply such as a battery or capacitor. For example, if the primary power source is unavailable, backup power 218 may power any portion of asset 200 (e.g., transceiver 113) thereby allowing asset 106 to communicate asset information (e.g., asset location) to server 104 and maintain any items therein. The secondary power supply may include a battery to provide power to transceiver 113 at a predefined interval to transmit updated asset information after the primary power source is unavailable. Alternatively, the secondary power supply may include a capacitor that may pulse power to transceiver 113 to transmit updated asset information after the primary power is unavailable.

Sensor 208 may include any device configured to indicate (e.g., to processor 105) movement, power loss, or tampering of or with respect to asset 106. For example, sensor 208 may include a switch (e.g., magnetic proximity, electrical contact, or photoelectric) configured to indicate opening of housing 220, for example, including disassembly of housing 220 or opening of door 222 (e.g., a refrigerator, washer, or dryer door). As another example, sensor 208 may be configured to detect cutting of a power cord of connector 214, for example, when AC power is disrupted between connector 214 and processor 105. As a further example, sensor 208 may be configured to indicate if connector 214 is plugged into a power outlet (e.g., socket 108 or a conventional socket) and if asset 106 is operating, damaged, receiving AC power, or requires service. In addition, sensor 208 may be configured to detect movement of or tampering with respect to asset 220 (e.g., transceiver 113) thereby allowing processor 202 to disable or limit power to asset 106. For example, sensor 208 may be configured to detect movement of asset 106 relative to a movement threshold, wherein transceiver 113 is configured to give an indication of the detected movement to server 104 in response to the movement threshold being met.

Alarm 216 may include any device configured to provide a notification or alert, for example, with respect to an indication of movement, power interruption, or tampering. The notification or alert may be provided in response to an indication from processor 105 with respect to sensor 208. Alarm 216 may be configured to provide a notification to server 104, e.g., using transceiver 113. Alarm 216 may be configured to provide an audio or visual alert, for example, using indicator 210. Alarm 216 may be configured to send a notification or alert, using communication module 204, if asset 106 has no AC power and is being powered by backup power 218.

Each asset 106 may be associated with an asset code that may be recognized by asset 106 and stored as part of memory 107 or database 114. Asset 106 may be configured to require the asset code, e.g., using transceiver 113, to change from the disabled condition to the enabled condition to activate full operation of asset 106. The asset code may be received from server 104 directly by transceiver 113 of asset 106 or indirectly using transceiver 113 of socket 108 or device 110 in communication with asset 106. Program 109 may activate asset 106 after confirming the asset location (e.g., using transceiver 113 of asset 106 or device 110) with server 104. If the asset location has changed, a new asset code may be required to regain the enabled condition or a full operation of asset 106. In the meantime, asset 106 may be configured to utilize a disabled condition with limited power, for example, to continue refrigeration of items (e.g., food or beverages) in compartment 224. As mentioned above, program 109 may include asset management applications to provide users with updated asset information (e.g., asset location).

Asset 106 may be configured to send continuous or period health checks to server 104. Health checks may be sent using transceiver 113 or over the power-line network. For example, if asset 106 is unplugged thereby disconnecting health checks via the power-line network, asset may utilize backup power 218 to power transceiver 113 to send health checks to server 104. In response to a health check indicating loss of power, server 104 may send automated notifications to device 110, device 112, and remote interface 116. Transceiver 113 of asset 106 may be configured to determine the asset location with transceiver 113 (e.g., using a GPS of asset 106 or device 110 in proximity to asset 106) as well as utilize transceiver 113 to communicate with a network device (e.g., wireless router) of a wireless network (e.g., using a Wi-Fi or RF transceiver of asset 106) to transmit health checks to server 104. Transceiver 113 of asset 106 may also be configured to auto-connect to any unsecured or public wireless network to communicate health checks to server 104. Transceiver 1113 (e.g., a GPS transceiver) may be powered by backup power 218 (e.g., battery or capacitor), which may be configured to provide power (e.g., continuous or intermittent pulses, respectively) while asset 106 is being moved. In addition, asset 106, upon repowering, may send a health check using a power-line network (e.g., connection 120) to provide updated asset information (e.g., asset location). If the updated asset information is not authorized by server 104 in a predetermined amount of time, asset 106 may be revered to the disabled condition. As an alternative example, operation of asset 106 (e.g., leased assets) may be remotely suspended by an owner (e.g., upon failure to pay rental fees or expiration of or failure to renew the lease) until the owner authorizes continued operation (e.g., payment of rental fees, renewal of the lease, or return of asset 106).

FIG. 3 illustrates an exemplary socket 108 of asset guardian system 100. Socket 108 may take many different forms and include multiple and/or alternate components and facilities. While an exemplary socket 108 is shown in FIG. 3, the exemplary components illustrated in FIG. 3 are not intended to be limiting. Indeed, additional or alternative components and/or implementations may be used.

As illustrated in FIG. 3, socket 108 may include processor 105, memory 107, transceiver 113, one or more connectors 304, a sensor 308, and a backup power 318. Processor 105 may be configured to operate transceiver 113, connectors 304, sensor 308, connectors 314, and backup power 318. Transceiver 113 may include any device configured to transmit or receive asset information such as an asset location, e.g., using a cellular, RF, or Wi-Fi transmitter. Sensor 308 may include any device configured to indicate (e.g., to processor 105) movement, power loss, or tampering of or with respect to asset 106, for example the embodiments of sensor 208. Memory 107 may be configured to store commands (e.g., disable or reduce power in response to movement or tampering with asset 106) or data 111 (e.g., asset information). Connectors 314 may include any device configured to connect to a power or data network or any device configured to receive connector 214 of asset 106. Connectors 314 may further include an identification mechanism, as discussed above with respect to connector 214. Backup power 318 may include any device configured to supply power, as discussed above with respect to backup power 218.

Socket 108 may include connector 314 (e.g., a female power socket) that may be configured to receive connector 214 (e.g., a male power cable) of asset 106. Socket 108 may further include a power line transceiver in or near connectors 304 (e.g. AC power receptacles) into which a particular asset 106 may be plugged. Further, connector 214 of asset 106 may include an identification mechanism that may be configured to recognize when connector 214 is in a connected or a separated condition with respect to connector 304. In response to the connected condition, connector 304 of socket 108 may provide power to asset 106 thereby allowing operation of asset 106. However, in a separated condition, no power may be provided by socket 108. Asset 106 or socket 108 may be configured to communicate the connected or separated condition to device 110 (e.g., using transceiver 113 of asset 106 or socket 108) or to database 114 (e.g., using a power-line network).

Operation of a particular asset 106 may be determined by the pairing of asset 106 and socket 108. Transceiver 113 of socket 108 may be configured to read asset information from identification mechanism 206 of asset 106. Socket 108 may be configured to communicate the asset information of asset 106 with server 104, for example, to authorize a pairing of one or more assets 106 with one or more sockets 108. Server 104 may maintain, as part of database 114, the asset information for authorized pairings of assets 106 and sockets 108. When asset 106 is in a connection condition with socket 108, asset 106 (e.g., using transceiver 113 or a power-line network provided by socket 108) or socket 108 (e.g., directly using the power-line network) may confirm the pairing is authorized according to server 104. If the asset information of the particular asset 106 matches the asset 106 authorized for socket 108, power may be provided to asset 106 resulting in asset 106 in the enabled condition. If the asset information of the particular asset 106 does not match, asset 106, socket 108, or server 104 may generate alerts or notifications and, in addition, power may be disabled or limited to asset 106 resulting in asset 106 in the disabled condition.

Exemplary alerts and notifications may include a notification message to server 104 with transceiver 113, a visual alert on indicator 210, a message on display 212, and an audio alert on alarm 216. Display 212 may indicate a message (e.g., that asset 106 requires authorization from device 110 or server 104) as well as asset information (e.g., a QR code of the particular asset 106). The asset information (e.g., QR code) may be scanned by device 110. Device 110 may propagate updated asset information (e.g., asset location), for example using GPS or cellular location information. Further, asset 106 may transmit asset information or the identification mechanism using transceiver 113 of asset 106 to device 110, for example, so asset 106 may be located by program 109. Asset 106 may also be configured to generate reports to server 104 (e.g., cloud server), for web-based propagation of alerts and notifications. In addition, program 109 may be configured to transmit commands to asset 106 using a wireless connection (e.g., connection 124), for example, to flash lights with indicator 210 and generate an audio alert with alert 216

Figure 4:
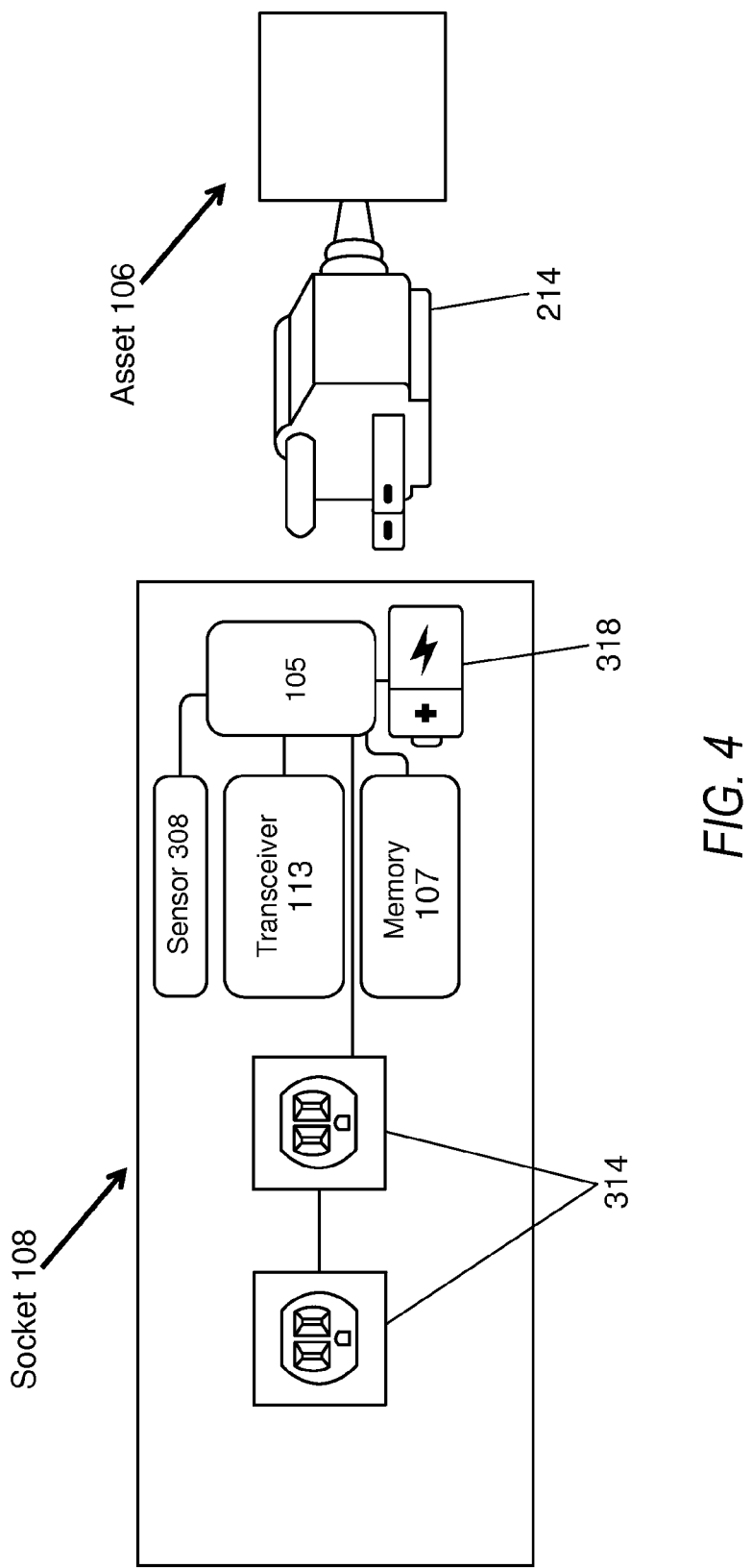
FIG. 4 illustrates an exemplary socket of an asset guardian system of the present disclosure.
Figure 5:
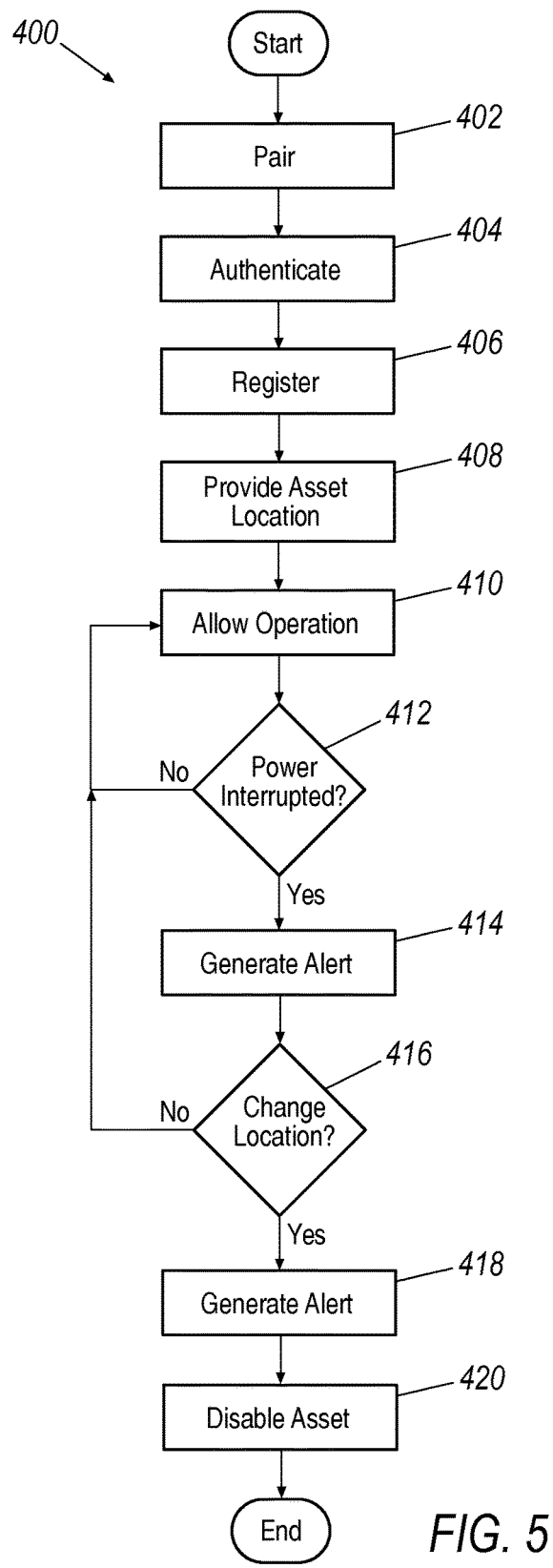
FIG. 5 illustrates an exemplary process flow related to operation of an asset guardian system of the present disclosure.

FIG. 4 illustrates an exemplary process 400 of asset guardian system 100. Process 400 may take many different forms and include multiple and/or alternate components and facilities. While an exemplary process 400 is shown in FIG. 4, the exemplary components illustrated in FIG. 4 are not intended to be limiting. Indeed, additional or alternative components and/or implementations may be used.

As illustrated in FIG. 4, exemplary process 400 may include the operations associated with the authentication and operation of assets 106 and sockets 108. Exemplary process 400 may include operations including authentication of asset 106 and socket 108, registering asset 106, monitoring power interruptions, monitoring asset information, and generating associated alerts.

At block 402, a particular asset 106 may be deployed for pairing with one or more sockets 108, for example, at a particular facility. An installer may physically plug asset 106 into socket 108. Asset 106 or socket 108 may connect with server 104, for example, using a wired (e.g., power-line) or wireless (e.g., Wi-Fi or RF) network connection to server 104. The asset information of asset 106 and socket 108 may be sent to server 104 and the asset controller of the appropriate controller group for authorization of pairing. Using device 110, the installer may confirm the pairing of asset 106 and socket.

At block 404, server 104 may send an asset code from database 114 to program 109 of asset 106, socket 108, or device 110, for example, using a power-line or wireless connection. If sent to device 110, device 110 may provide the asset code to asset 106 directly or socket 108 in communication with asset 106. The asset code may be in an encrypted format when it is received by mobile phone 106 to prevent trapping of the asset code by the installer or unauthorized propagation of the asset code by mobile phone 106. Alternatively, the asset code may be provided directly to asset 106 or socket 108 in communication with asset 106. After the asset code is received and decrypted if necessary by asset 106, asset 106 may authenticate the received asset code with the asset code as part of memory 107 of asset 106 or as part of database 114.

At block 406, asset 106 or socket 108 may send the authenticated asset code to server 104 for registration of the particular asset 106 and socket 108 to server 104 and designation of the appropriate controller group according to database 114.

At block 408, asset 106 or socket 108 may provide updated asset information (e.g., asset location) to database 114 on server 104.

At block 410, the controller group may authorize a change from the disabled condition (partially or fully disabled) to the enabled condition (e.g., full operation) of asset 106 based on the current asset information. For example, if the current asset information (e.g., actual asset location) received by server 104 from device 110, asset 106, or socket 108 matches the authorized asset information (e.g. correct asset location) on database 114, operation of asset 106 and socket 108 may be allowed with asset 106 in the enabled condition. If the asset information does not match, operation of asset 106 and socket 108 may be disallowed with asset 106 remaining in the disabled condition.

At decision point 412, system 100 may be configured to monitor power interruptions with respect to assets 106 and sockets 108. If a power interruption occurs, asset 106 or socket 108 may indicate a power interruption to server 104. If asset 106 or socket 108 indicates a power resumes within a predefined time, system 100 may allow operation according to block 410. If the power does not resume within the predefined time, asset 106 or socket 108 may generate an alert or notification.

At block 414, asset 106 or socket 108 may generate an alert or notification. Asset 106 may initiate an audio or visual alert. Asset 106 or socket 108 may also propagate an alert or notification to system 100, for example, an automated phone call, email, or text message to the appropriate asset controllers.

At decision point 416, system 100 may be configured to monitor the asset location with respect to asset 106. The asset location of asset 106 may be provided to server 104 periodically or after an indication from sensor 208 or 308, for example detection of a power interruption. If asset 106 the transceiver 113 (e.g. GPS) indicates a location change outside a predefined area (e.g. a distance relative to a particular facility), asset 106 may indicate the location change to server 104 and generate an alert or notification. If asset 106 remains in the predefined area, system 100 may allow operation according to block 410.

At block 418, asset 106 or socket 108 may generate an alert or notification as discussed with respect to block 414.

At block 420, if asset 106 remains outside the predefined area for a predefined time, asset 106 may be disabled by processor 105, device 110, or server 104. For example, the AC power supply of asset 400 may be disabled with asset 106 in the disabled condition.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An asset guardian system, comprising:
a server including a server processor with server memory configured to store registered asset information including an asset code and an asset location;

an asset guardian program configured to communicate the registered asset information including the asset code and asset location; and at least one asset including an asset processor and asset memory with local asset information, the asset processor configured to receive the asset code and asset location by way of the at least one asset being plugged into a power receptacle of a power socket having a power line transceiver in communication with the server by way of the asset guardian program and authenticate that the asset code and asset location according to the server matches the local asset information according to the at least one asset, wherein the at least one asset is communicatively connected to the power socket having the power line transceiver in connection with a power-line network to authorize, with the server, a pairing between the at least one asset and the power socket, and wherein the at least one asset is configured to change, based on the authentication of the asset code and asset location from the power socket, between a disabled condition with at least partially disabled power to inhibit use while monitoring and maintaining contents of the at least one asset and an enabled condition with full power.

2. The system of claim 1, further comprising a mobile device configured to provide the asset code, using the asset guardian program, to the at least one asset.

3. The system of claim 1, wherein the at least one asset includes an asset transceiver configured to send an updated asset location to the server, wherein the server is configured to update the registered asset information with the updated asset location.

4. The system of claim 1, wherein the at least one asset includes an asset transceiver configured to wirelessly receive the asset code and transmit an authenticated asset code to the server.

5. The system of claim 1, wherein the at least one asset is configured to communicatively connect to the power socket, wherein the asset code is received from the power line transceiver of the power socket.

6. The system of claim 1, wherein the at least one asset includes an asset transceiver configured to communicate, by the power line transceiver of the power socket, a health check to the server in response to being connected to the power-line network.

7. The system of claim 1, wherein the at least one asset communicates the authenticated asset code to the server.

8. The system of claim 1, wherein the asset information is configured to be encrypted by the server using a secure key class and is unencrypted by the asset with a key as part of the asset memory.

9. An asset guardian device, comprising:

an asset having an asset processor and asset memory with local asset information, the asset processor being configured to receive registered asset information including an asset code and an asset location by way of the asset being plugged into a power receptacle of a power socket having a power line transceiver in communication with a server and authenticate that the asset code and asset location according to the server matches the local asset information according to the asset; and an asset transceiver operatively connected to the asset processor and configured to send confirmation of the authenticated asset code and asset location to the server, wherein the asset is communicatively connected to the power socket having the power line transceiver in connection with a power-line network to authorize, with the server, a pairing between the asset and the power socket, and wherein the asset processor is configured to change, based on the authentication of the asset code and asset location from the power socket, the asset between a disabled condition with at least partially disabled power to inhibit use while monitoring and maintaining contents of the at least one asset and an enabled condition with full power.

10. The device of claim 9, further comprising a sensor configured to detect movement of the asset relative to a movement threshold, wherein the asset transceiver is configured to send an indication of the detected movement to the server in response to the movement threshold being met.

11. The device of claim 9, further comprising a power supply configured to provide power to the asset in response to the authenticated asset code.

12. The device of claim 9, further comprising a power supply configured to reduce or limit power provided to the asset in response to a notification that the asset has been changed between the enabled condition and the disabled condition.

13. The device of claim 9, wherein an updated asset location of the asset is determined by the asset transceiver and transmitted to the server.

14. The device of claim 9, wherein an updated asset location of the asset is determined by a global positioning system of a mobile device in proximity to the asset.

15. The device of claim 9, wherein the power socket is configured to provide the asset code to the asset and provide power to the asset in response to authentication of the asset code.

16. The device of claim 9, wherein the asset transceiver is configured to receive the asset code from a radio-frequency network with a mobile device and send the authenticated asset code to the server with a cellular network.

17. The device of claim 9, wherein the asset transceiver is configured to communicate, by the power line transceiver of the power socket, a health check to the server in response being connected to the power-line network.

18. The device of claim 9, wherein the asset transceiver is configured to communicate a health check to at least one wireless router of a Wi-Fi network.

19. A non-transitory computer-readable medium tangibly embodying computer-executable instructions of a software program, the software program being executable by a processor of a computing device to provide operations comprising:

receiving, by way of at least one asset being plugged into a power receptacle of at least one power socket with a power line transceiver in communication with a server including a processor and a database, asset information including an asset code and an asset location regarding the at least one asset from the at least one power socket, wherein the at least one asset is communicatively connected to the at least one power socket having the power line transceiver in connection with a power-line network to authorize a pairing between the at least one asset and the at least one power socket;

updating part of the database with asset information received by the server;

providing the asset code and asset location to the at least one asset having an asset processor and asset memory with local asset information, the asset processor being configured to authenticate that the asset code and asset location from the server matches the local asset information; and changing, based on authentication of the asset code and asset location from the at least one power socket, the at least one asset, between a disabled condition with at least partially disabled power to inhibit use while monitoring and maintaining contents of the at least one asset and an enabled condition with full power.

20. The medium of claim 19, further comprising: providing a notification to a user in response to the at least one asset being changed between the enabled condition and the disabled condition.

* * * * *